United States Patent
Berti et al.

(10) Patent No.: US 6,805,053 B2
(45) Date of Patent: Oct. 19, 2004

(54) METHOD AND DEVICE FOR SUPPRESSING VIBRATIONS IN A PRINTING PRESS

(75) Inventors: Christopher Berti, Dielheim (DE); Bernhard Buck, Heidelberg (DE); Holger Faulhammer, Stuttgart (DE); Michael Krüger, Edingen-Neckarhausen (DE); Jürgen Maass, Wiesloch (DE); Sven Mader, Dielheim (DE); Stefan Maier, Heidelberg (DE); Kai Oskar Müller, Birkenau (DE); Matthias Nöll, Weiterstadt (DE); Martin Riese, Radebeul (DE); Bernhard Roskosch, Wiesloch (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 149 days.

(21) Appl. No.: 10/301,089

(22) Filed: Nov. 20, 2002

(65) Prior Publication Data

US 2003/0132076 A1 Jul. 17, 2003

(30) Foreign Application Priority Data

Nov. 20, 2001 (DE) .......................... 101 56 801

(51) Int. Cl.⁷ ................................. B41F 1/34
(52) U.S. Cl. ................. 101/480; 101/483; 101/484; 101/216
(58) Field of Search ................ 101/212–219, 101/480, 350.3, 351.3, 352.6, 352.9, 483–485, 216

(56) References Cited

U.S. PATENT DOCUMENTS

| | | | |
|---|---|---|---|
| 5,235,909 A | | 8/1993 | Gerstenberger et al. ..... 101/216 |
| 5,595,117 A | * | 1/1997 | Chrigui ...................... 101/216 |
| 5,596,931 A | * | 1/1997 | Rossler et al. .............. 101/484 |
| 6,387,214 B1 | | 5/2002 | Kustermann et al. ....... 162/198 |
| 6,401,620 B1 | * | 6/2002 | Buck et al. .................. 101/484 |
| 6,615,726 B2 | * | 9/2003 | Douillard et al. ........... 101/483 |
| 2002/0158180 A1 | | 10/2002 | Noell ......................... 248/550 |
| 2003/0230205 A1 | * | 12/2003 | Mutschler et al. .......... 101/216 |

FOREIGN PATENT DOCUMENTS

| | | |
|---|---|---|
| DE | 130 321 | 3/1977 |
| DE | 40 33 278 C1 | 3/1992 |
| DE | 196 21 854 C1 | 7/1999 |
| DE | 199 30 600 A1 | 2/2000 |
| DE | 199 14 613 A1 | 10/2000 |
| DE | 199 63 945 C1 | 7/2001 |
| DE | 101 17 709 A1 | 11/2001 |
| DE | 101 49 525 A1 | 5/2002 |
| WO | WO 97/03832 | 2/1997 |

* cited by examiner

*Primary Examiner*—Minh H Chau
(74) *Attorney, Agent, or Firm*—Laurence A. Greenberg; Werner H. Stemer; Gregory L. Mayback (57) ABSTRACT

A method and device for suppressing vibrations in a printing press includes placing, on at least one element of the press, a mass that vibrates freely with one degree of freedom, determining the rotational speed of the press and feeding the speed to a control device, and, in the control device, utilizing the rotational speed, determining an actuating variable and feeding the actuating variable to at least one actuator, at least one vibration parameter of the mass being changed in accordance with the rotational speed by the actuator.

16 Claims, 6 Drawing Sheets

METHOD AND DEVICE FOR SUPPRESSING VIBRATIONS IN A PRINTING PRESS

BACKGROUND OF THE INVENTION

1. Field of the Invention

The invention relates to a method and a device for suppressing vibrations in a printing press, in which a freely vibrating mass is used on a vibrating element.

In the drive of printing presses, such as sheet-fed presses, use is made inter alia of belt and gear mechanisms. In the gear train of a cyclically printing sheet-fed press, undesired excitation of vibrations occurs at various points, the vibrations not being of integer orders, that is to say, they do not repeat once, twice, or n times per printed sheet. Such excitation leads to vibrations of the same order that, in printing terms, manifest themselves as faults whose position changes from sheet to sheet. Such printing faults, which show themselves, for example, as stripes in the printed image, are more striking than faults whose position does not change from sheet to sheet. Typical causes of such faults in sheet-fed presses are belt drives and drives for distributor rolls, which do not exhibit any integer revolution orders.

Printing presses are generally driven by electric motors. The drive torque from an electric motor is fed through a belt drive into a gear train, from which the cylinders, drums, and rolls in the printing units are driven. Existing in the prior art is the determination of disruptive vibrations, for example, on a cylinder, by using a sensor and driving one or more electric motors such that the vibrations are reduced. In addition, active absorbers can be provided, which are likewise driven in a vibration-compensating manner. The drawback is the high outlay for determining the disruptive vibrations. In order to register the vibrations at all points at which they are produced, a large number of active absorbers would have to be used in addition to a large number of sensors.

Printing presses can be configured such that odd-numbered excited vibrations are avoided to the greatest possible extent. If a belt drive is used in the gear train, it is, in principle, not possible, because of the slip that is naturally present, to implement this over the entire speed range. In the case of sheet-fed presses, there are generally revolving elements in the area of the inking units that, as compared with the sheet-carrying cylinders, revolve with non-integer orders. Construction measures to keep the vibration excitation small by predefining appropriate tolerances are subject to fabrication limits. For example, the faults originating from a belt or the round running properties of distributor rolls can be reduced or improved only with increased design effort.

A printing press, as a structure capable of vibrating, exhibits natural resonances. One way of reducing undesired vibrations is to move resonances with odd-numbered orders into a non-critical speed range. In the case of sheet-fed presses, for example, the belt length in belt drives can be dimensioned suitably. The variation in the belt length has its limits in the overall space that is available and in the effect on the machine dynamics resulting from a longer and therefore softer belt. A further way lies in the use of an absorber matched to the natural frequency of a machine, as described in German Published, Non-Prosecuted Patent Application DE 199 14 613 A1.

East German Patent No. DD 130 321 A1 describes a device for absorbing torsional vibrations in the drive of presses, in which a pendulum is rotatably connected to one or more axes of rotation of a drive. The pendulum is matched to a specific excitation order of the rotational frequency range of the drive. The mass of rotation and stiffness of the pendulum are not changed.

German Published, Non-Prosecuted Patent Application DE 40 33 278 A1, corresponding to U.S. Pat. No. 5,235,909 to Gerstenberger et al., shows a device for damping flexural vibrations of printing-unit cylinders in which, in the printing-unit cylinder, one or more broadband-tuned dampers are provided, whose natural frequencies correspond to those of the respective printing-unit cylinder and that are deflected by centrifugal force in antiphase with the printing-unit cylinder. The mass of rotation and stiffness of the dampers remains constant.

Such systems, used in horizontally mounted cylinders, operate optimally only in a rotational speed range in which the force of gravity that acts can be neglected as compared with the centrifugal forces.

SUMMARY OF THE INVENTION

It is accordingly an object of the invention to provide a method and device for suppressing vibrations in a printing press that overcome the hereinafore-mentioned disadvantages of the heretofore-known devices and methods of this general type and that develop their action over the entire rotational speed range with little outlay.

With the foregoing and other objects in view, there is provided, in accordance with the invention, a method of suppressing vibrations in a printing press, including the steps of providing a mass vibrating freely with one degree of freedom on at least one element of the press, determining a rotational speed of the press and supplying the determined rotational speed to a control device, determining an actuating variable dependent upon the rotational speed with the control device and supplying the actuating variable to at least one actuator with the control device, and changing at least one vibration parameter of the mass with the actuator dependent upon the determined rotational speed.

The nub of the invention is that, on at least one element excited to vibrate in a printing press, a freely vibrating mass is used, at least one vibration parameter of the mass being changed continuously as a function of rotational speed by an actuator. At least one vibration parameter of the mass is set such that the frequency of the critically exciting vibration of the element of the press corresponds to the natural frequency of the freely vibrating mass.

The invention is suitable both for absorbing torsional and flexural vibrations. The system including actuator and vibration absorbing mass is used as far as possible on the element excited to vibrate or on an element in its immediate vicinity.

In accordance with another mode of the invention, a stiffness of the mass is changed with the actuator.

In accordance with a further mode of the invention, inertia of the mass is changed with the actuator.

With the objects of the invention in view, there is also provided a method of suppressing vibrations in a printing press, including the steps of providing a mass vibrating freely with one degree of freedom on at least one element of the press, determining a rotational speed of the press and supplying the determined rotational speed to a control device, and determining an actuating variable in the control device utilizing the rotational speed and supplying the actuating variable to at least one actuator, at least one vibration parameter of the mass being changed by the actuator dependent upon the rotational speed.

With the objects of the invention in view, there is also provided a device for suppressing vibrations in a printing press having at least one element, including a freely vibrating mass vibrating freely with one degree of freedom to be coupled to the at least one element, the mass having at least one vibration parameter, a rotational speed measuring configuration for determining a rotational speed of the press, an actuator connected to the mass for changing the vibration parameter, and a control device connected to the rotational speed measuring configuration and to the actuator.

In accordance with an added feature of the invention, the element has an axle, the mass displaceable on the axle, and at least one leaf spring is disposed parallel to the axle and is coupled to the element and the mass.

In accordance with an additional feature of the invention, there is provide an axle, the mass being displaceable on the axle, and at least one leaf spring disposed parallel to the axle and coupled to the element and the mass.

In accordance with yet another feature of the invention, the element is a revolving element having a radial direction, and the mass is displaceable in the radial direction of the revolving element.

In accordance with yet a further feature of the invention, an inhomogeneous, elastic rotating body is coupled to the actuator, rotates about an axis, and is coupled to the element and the mass.

In accordance with yet an added feature of the invention, the actuator is at least one electromagnet.

In accordance with yet an additional feature of the invention, the actuator is at least one pneumatic element.

In accordance with again another feature of the invention, the element is a revolving element and the actuator revolves with the revolving element.

In accordance with again a further feature of the invention, the press has a frame and the actuator is to be fixed to the frame.

In accordance with again an added feature of the invention, the actuator is disposed at the mass.

In accordance with again an additional feature of the invention, the actuator is disposed on the mass.

With the objects of the invention in view, in a printing press having at least one element, there is also provided a device for suppressing vibrations, including a freely vibrating mass vibrating freely with one degree of freedom coupled to the element, the mass having at least one vibration parameter, a rotational speed measuring configuration for determining a rotational speed of the press, an actuator connected to the mass for changing the vibration parameter, and a control device connected to the rotational speed measuring configuration and to the actuator.

Other features that are considered as characteristic for the invention are set forth in the appended claims.

Although the invention is illustrated and described herein as embodied in a method and device for suppressing vibrations in a printing press, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figures 1, 2:
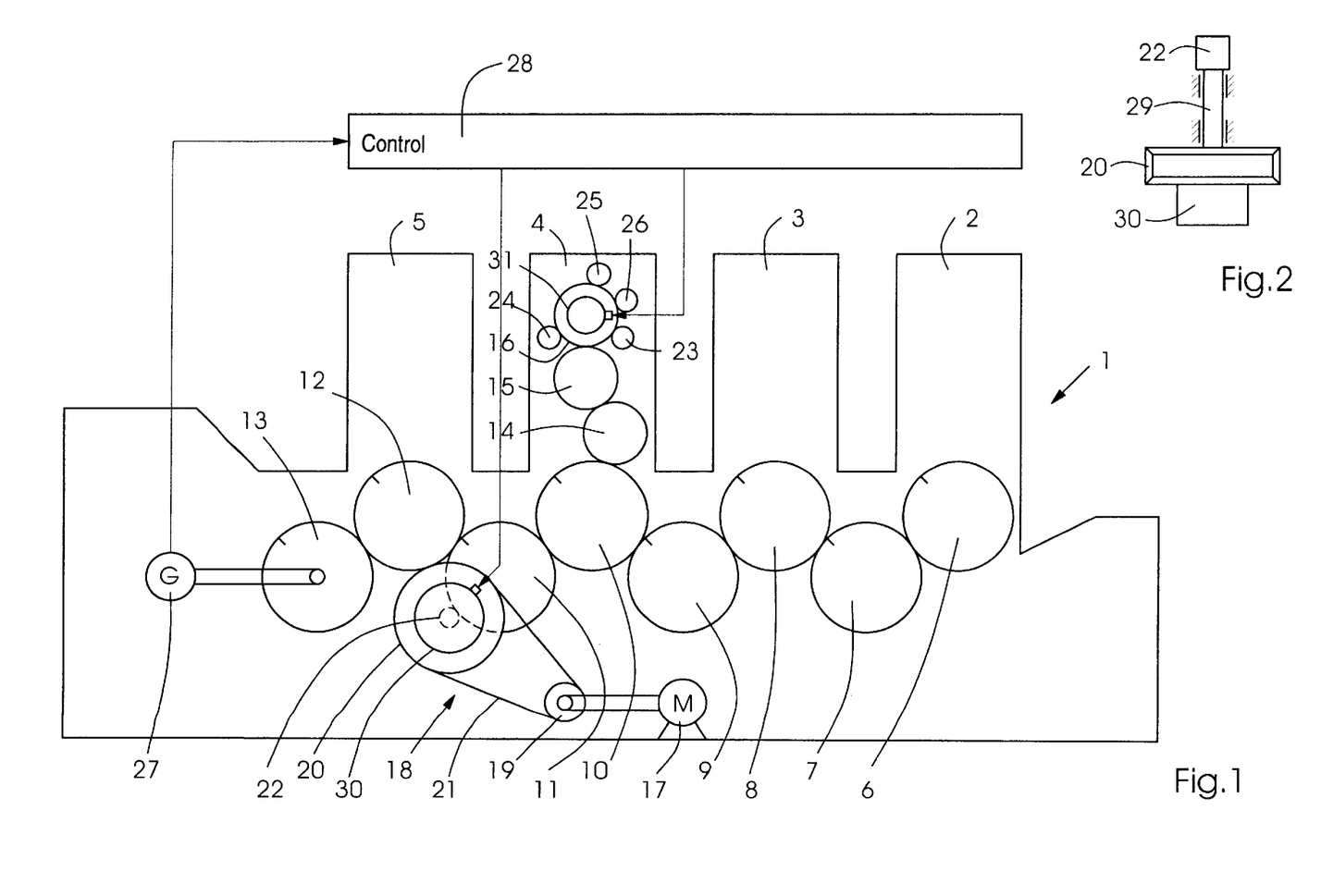
FIG. 1 is a diagrammatic side view of a press having two absorbers according to the invention.
FIG. 2 is a diagrammatic side view of an embodiment of an absorber of FIG. 1.

Referring now to the figures of the drawings in detail and first, particularly to FIG. 1 thereof, there is shown a press having four printing units 2–5. The press contains a gear train including gears 6–16, which engage in one another. To drive the press 1, a motor 17 is provided, which is connected to a belt mechanism 18 that includes a small belt pulley 19, a large belt pulley 20, and a belt 21. Seated on the shaft of the large belt pulley 20 is pinion 22 that is engaged with the gear 11. The gear 16 is connected to gears 23–26, which serve to drive distributor rolls. The printing units 2, 3, 5 are constructed in an analogous way to the printing unit 4. A rotary encoder 27 coupled to the gear 13 is connected to a control device 28.

As FIG. 2 illustrates, an absorber 30, which is connected to the control device 28 (see FIG. 1), is provided coaxially with the shaft 29 of the pinion 22 and the belt pulley 20. A further absorber 31 is situated on the gear 16 for the distributor drive. The absorber 31 is, likewise, connected to the control device 28.

The rotational speed of the press 1 is determined by the rotary encoder 27 and fed to the control device 28. The rotational speeds of all the elements revolving through the gear train 6–16 and 23–26 are proportional to the rotational speed of the gear 13. The measured values relating to the rotational speed of the press 1 are present in the control device 28 and are processed there to form actuating variables for actuators that are constituent parts of the absorbers 30, 31. The actuating variables are transmitted to the actuators through the connection to the absorbers 30, 31. The actuating variables in each case have the effect on the actuators of changing, as a function of the rotational speed, a vibration parameter of a mass that is, likewise, a constituent part of the respective absorber 30, 31. The absorber 30 compensates for undesired vibrations that originate from the belt drive 18. The absorber 31 suppresses undesired vibrations that are caused by reciprocating distributor rolls.

Exemplary embodiments of absorbers 30, 31 will be described in the following text.

Figure 3A:
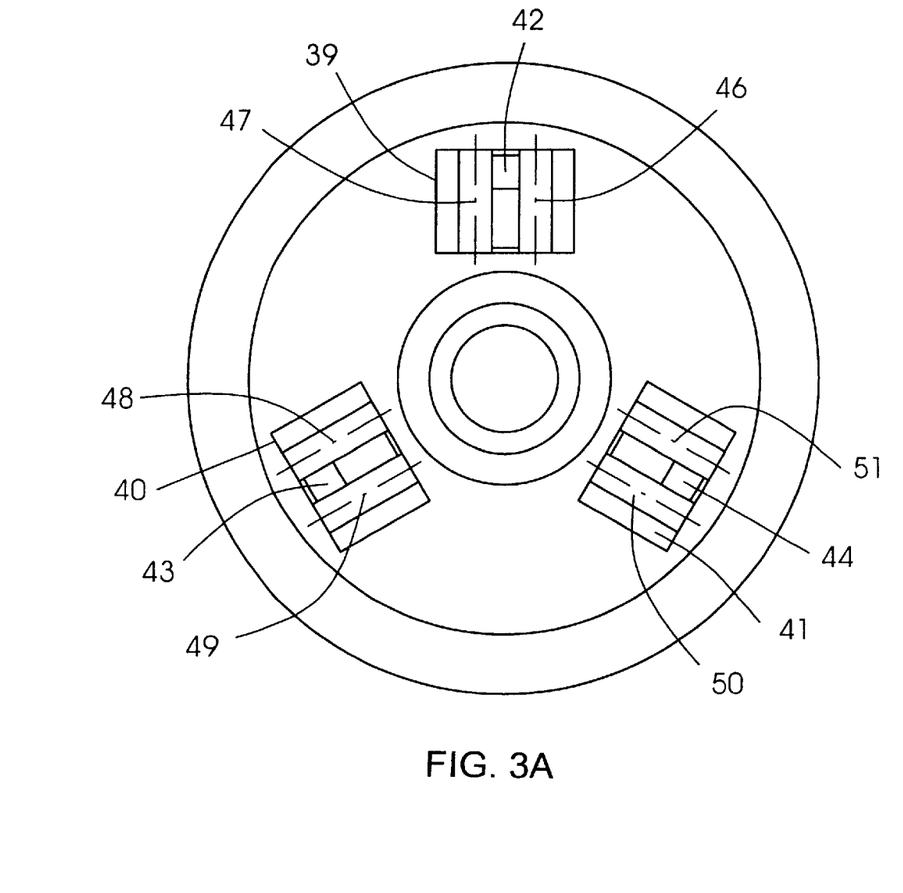
FIG. 3A is a plan view of a first embodiment of an absorber according to the invention with an axially displaceable mass.
Figure 3B:
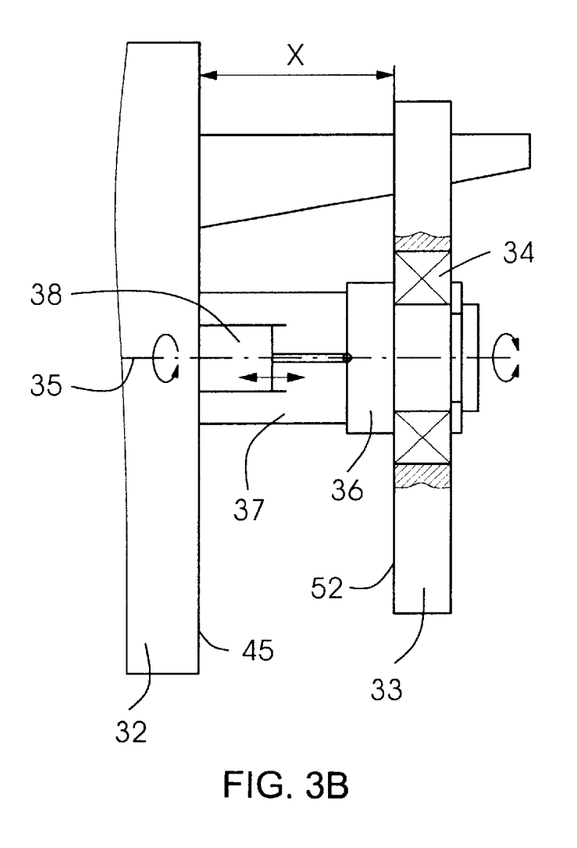
FIG. 3B is a fragmentary, cross-sectional view of the absorber of FIG. 3A.

FIGS. 3A and 3B show a revolving element 32 in a press 1, such as the belt pulley 20 or the gear 16 (FIG. 1). The mounting and drive of the element 32 are not further illustrated. The element 32 is excited by undesired rotational vibrations and, to absorb such vibrations, an absorber mass 33 in the shape of a cylindrical disk is provided. The absorber mass 33 is mounted in a bearing 34 such that it can rotate freely about an axis 35, which coincides with the axis of rotation of the element 32. The bearing 34 is seated on a guide piece 36, which can be displaced in the direction of the axis 35 on a journal 37 that is disposed on the element 32. To displace the guide piece 36 and, therefore, the absorber mass 33, a linear actuator 38 is provided, such as an operating cylinder. The absorber mass 33 has three apertures 39, 40, 41 that are disposed to be offset by 120 degrees and through which trapezoidal leaf springs 42, 43, 44 project, which are fixed to the front side 45 of the element 32 in the direction parallel to the axis 35. The leaf springs 42, 43, 44 are respectively guided on both sides without play in the apertures 39, 40, 41 by rollers 46, 47, 48, 49, 50, 51.

Depending on the rotational speed of the press 1, the distance x of the front side 52 of the absorber mass 33 in relation to the front side 45 of the element 32 is set by the actuator 38. The stiffness $k_B$ of a leaf spring 42, 43, 44 depends on the distance x. The natural frequency $\omega_T$ of the absorber mass 33 is given by:

$$\omega_T = \sqrt{\frac{3k_B}{J_T}}$$

where $J_T$ designates the moment of inertia of the absorber mass 33. The natural frequency $\omega_T$ can, therefore, be set suitably by setting the distance x such that disruptive excitation frequencies on the element 32 are suppressed.

Figure 4A:
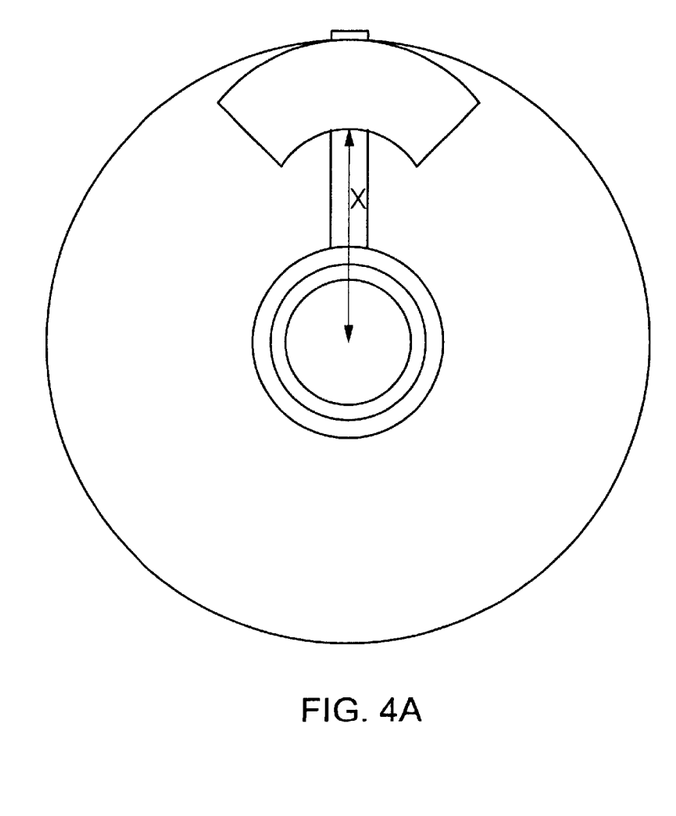
FIG. 4A is a plan view of a second embodiment of an absorber according to the invention with a radially displaceable mass.
Figure 4B:
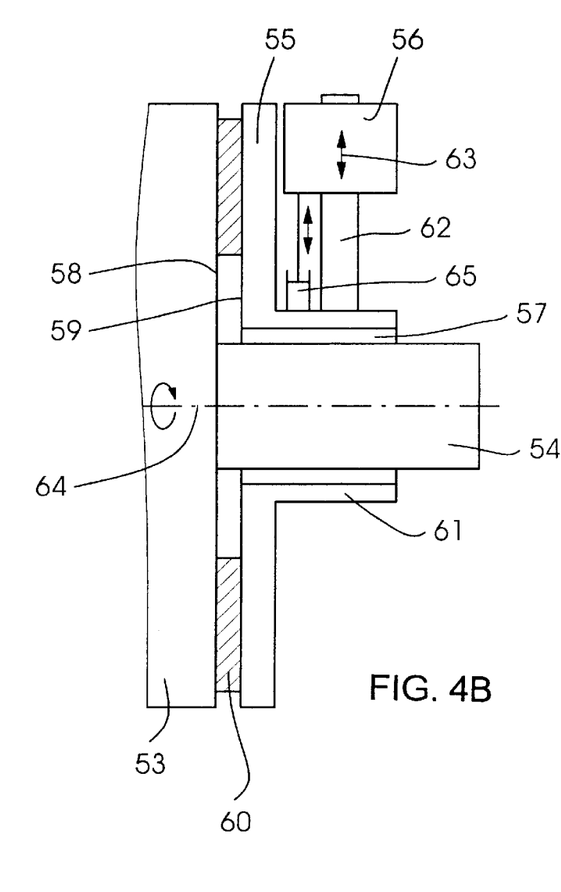
FIG. 4B is a fragmentary, cross-sectional view of the absorber of FIG. 4A.

FIGS. 4A and 4B show a further exemplary embodiment of an absorber 30, 31. There is a journal 54 disposed at a revolving element 53. The element 53 is subject to disruptive rotational vibrations. To suppress such vibrations, a nonvariable absorber mass 55 and a variable-radius absorber mass 56 are provided. The absorber mass 55 is retained on the journal 54 by a bearing 57 such that it can rotate. Front sides 58, 59 of the element 53 and of the disk-like absorber mass 55 are connected by an elastomer spring 60 having a torsional stiffness of $k_E$. The absorber mass 55 has a hub 61, to which a guide rod 62 is fixed. The guide rod 62 is located in the radial direction 63 at right angles to the axis of rotation 64 of the element 53 and of the absorber mass 55, 56. The absorber mass 56 is retained such that it can be displaced on the guide rod 62. To displace the absorber mass 56 in the radial direction 63, an actuator 65 is provided that, for example, is configured as an operating cylinder, the piston of the operating cylinder being coupled to the absorber mass 56.

In the case of the absorber configuration according to FIGS. 4A and 4B, the moment of inertia $J_T$ is given by:

$$J_T = J_1 + J_{2,A} + m \cdot x^2$$

where:

$J_1$ is the moment of inertia of the absorber mass 55;

$J_2$ is the moment of inertia of the absorber mass 56 and of the actuator 65;

m is the variable-radius mass of the absorber mass 56 and of the actuator 65; and x is the distance of the absorber mass 56 from the axis of rotation 64.

The distance x of the absorber mass 56, and, therefore, the natural frequency of the absorber configuration, is set by the actuator 65 in accordance with the rotational speed of the press 1 such that the disruptive rotational vibrations on the element 53 are suppressed. For the absorber configuration, the result is a natural frequency $\omega_T$ according to the following relationship:

$$\omega_T = \sqrt{\frac{k_E}{J_T}}$$

Figure 5A:
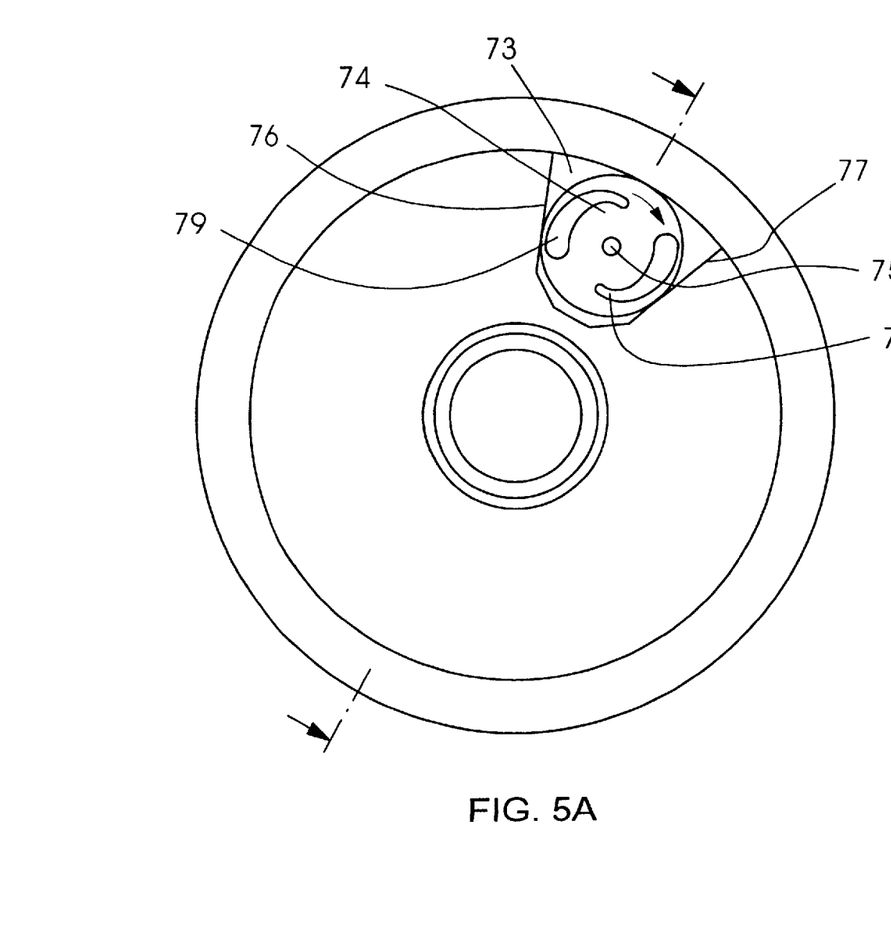
FIG. 5A is a plan view of a third embodiment of an absorber according to the invention with a rotatable elastomer body.
Figure 5B:
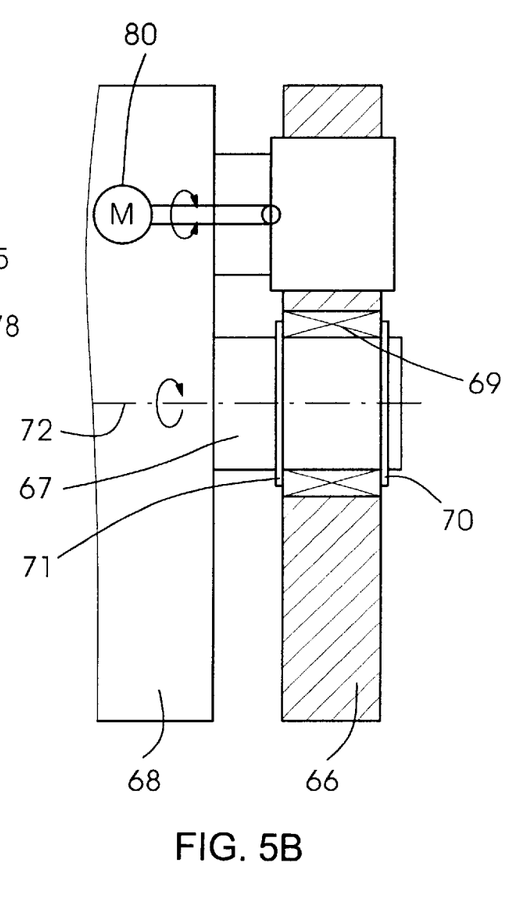
FIG. 5B is a fragmentary, cross-sectional view of the absorber of FIG. 5A.

In a variant according to FIGS. 5A and 5B, an absorber mass 66 is freely rotatably mounted in a bearing 69 on a journal 67 of a revolving element 68. The absorber mass 66 is secured by securing rings 70, 71 against displacement in the direction of the axis of rotation 72 of the element 68 or the absorber mass 66. To absorb rotational vibrations on the element 68, the absorber mass 66 is provided with an aperture 73. In the aperture 73, a cylindrical elastomeric body 74 is mounted such that it can rotate about an axis 75. The elastomeric body 73 rests without play on side faces 76, 77 running radially on the aperture 73. The elastomeric body 74 has in the interior cavities 78, 79, whose cross-section increases and decreases in the circumferential direction around the axis 75. The elastomeric body 74 is coupled to a rotational actuator 80, with which the elastomeric body 74 can be rotated about the axis 75. Because of the cavities 78, 79, the torsional stiffness $k_E$ of the elastomeric body 74 with respect to the rotation about the axis of rotation 72 changes with the rotational angle φ of the elastomeric body 74 in the aperture 73.

Depending on the rotational speed of the press 1, the rotational position φ of the elastomeric body 74 in the aperture 73 is changed by the actuator 80. The natural frequency $\omega_T$ of the absorber configuration that is established is given by $$\omega_T = \sqrt{\frac{k_E}{J_T}}$$

where $J_T$ is the moment of inertia of the absorber mass 66 and of the elastomeric body 74.

Figure 6A:
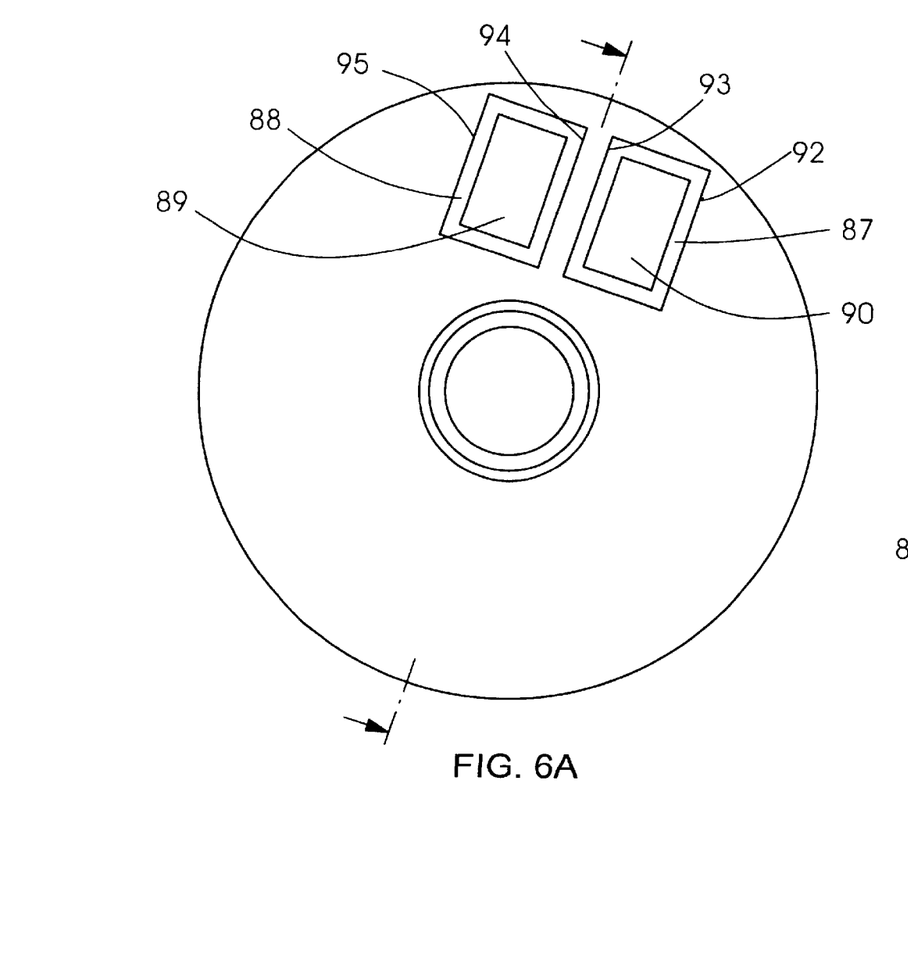
FIG. 6A is a plan view of a fourth embodiment of an absorber according to the invention with an electromagnetic actuator.
Figure 6B:
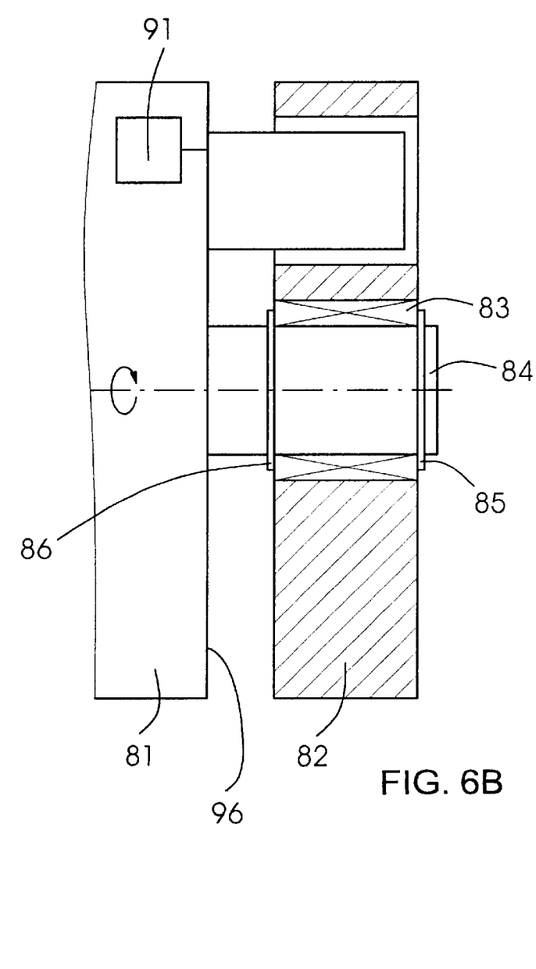
FIG. 6B is a fragmentary, cross-sectional view of the absorber of FIG. 6A.

FIGS. 6A and 6B show an exemplary embodiment having an electromagnetic order absorber. To absorb rotational vibrations on a revolving element 81, an absorber mass 82 made of a ferrous material is provided, which is rotatably mounted on a journal 84 of the element 81 by a bearing 83 and which is secured by securing rings 85, 86 against displacement on the journal 84. The absorber mass 82 has rectangular apertures 87, 88, only two being shown in FIG. 6A. Situated in the apertures 87, 88 are electromagnets 89, 90, which are connected to an adjustable current source 91. The current in the electromagnets 89, 90 produces a magnetic field, which exerts a force such that, in each case, there is an air gap between the electromagnets 89, 90 and the side faces 92, 93, 94, 95, which is also maintained while the element 81 is rotating. The system including the absorber mass 82, the electromagnets 89, 90 fixed to a front face 96, and the air gaps forms a torsion spring, whose stiffness $k_L$ depends directly on the coil current in the electromagnets 89, 90. The current source 91 constitutes an actuator with which, depending on the rotational speed of the press 1, the current and, therefore, the stiffness $k_L$ is changed. The result for such an absorber configuration is a natural frequency that counteracts disruptive excitation frequencies on the element 81 in a compensatory manner.

Figures 7A, 7B:
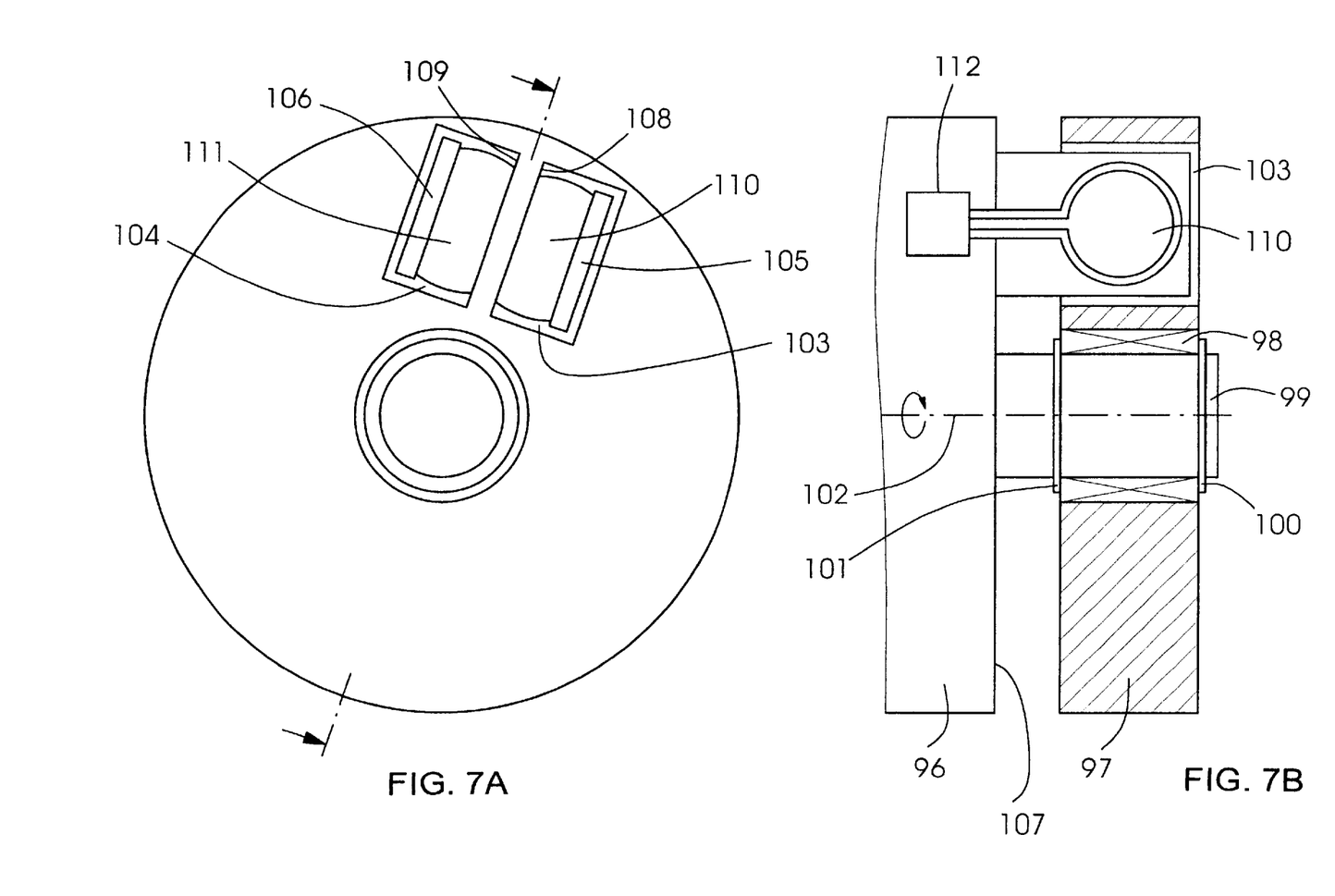
FIG. 7A is a plan view of a fourth embodiment of an absorber according to the invention with a pneumatic actuator.
FIG. 7B is a fragmentary, cross-sectional view of the absorber of FIG. 7A.

According to FIGS. 7A and 7B, to absorb rotational vibrations on a revolving element 96, use is made of an absorber mass 97 that is mounted such that it can rotate on a journal 99 of the element 96 by a bearing 98 and that is secured by securing rings 100, 101 against displacement in the direction of the axis of rotation 102. As viewed in the circumferential direction, the disk-like absorber mass 97 has apertures 103, 104, of which only two are shown in FIG. 7A. Supporting plates 105, 106, which are fixed to a front face 107 of the element 96 project into the apertures 103, 104. Air bags 110, 111 are respectively provided between a side face 108, 109, located in the circumferential direction, of an aperture 103, 104 and a supporting plate 105, 106, the internal pressure of the air bags 110, 111 being adjustable by a pressure control system 112 that is accommodated in the element 96. By setting the pressure in the air bags 110, 111 as a function of the rotational speed, the natural frequency of the absorber configuration can be set to suppress disruptive excitation vibrations. Together with the supporting plates 105, 106 and the absorber mass 97, the air bags 110, 111 form a spring system whose stiffness $k_L$ depends on the pressure in the air bags 110, 111.

We claim:

1. A method of suppressing vibrations in a printing press, which comprises:
    providing a mass vibrating freely with one degree of freedom on at least one element of the press;
    determining a rotational speed of the press and supplying the determined rotational speed to a control device;
    determining an actuating variable dependent upon the rotational speed with the control device and supplying the actuating variable to at least one actuator with the control device; and
    changing at least one vibration parameter of the mass with the actuator dependent upon the determined rotational speed.

2. The method according to claim 1, which further comprises changing a stiffness of the mass with the actuator.

3. The method according to claim 1, which further comprises changing inertia of the mass with the actuator.

4. A method of suppressing vibrations in a printing press, which comprises:
    providing a mass vibrating freely with one degree of freedom on at least one element of the press;
    determining a rotational speed of the press and supplying the determined rotational speed to a control device; and
    determining an actuating variable in the control device utilizing the rotational speed and supplying the actuating variable to at least one actuator, at least one vibration parameter of the mass being changed by the actuator dependent upon the rotational speed.

5. A device for suppressing vibrations in a printing press having at least one element, comprising
    a freely vibrating mass vibrating freely with one degree of freedom to be coupled to the at least one element, said mass having at least one vibration parameter;
    a rotational speed measuring configuration for determining a rotational speed of the press;
    an actuator connected to said mass for changing said vibration parameter; and
    a control device connected to said rotational speed measuring configuration and to said actuator.

6. The device according to claim 5, wherein:
    said element has an axle;
    said mass displaceable on said axle; and
    at least one leaf spring is disposed parallel to said axle and is coupled to said element and said mass.

7. The device according to claim 5, including:
    an axle, said mass being displaceable on said axle; and
    at least one leaf spring disposed parallel to said axle and coupled to said element and said mass.

8. The device according to claim 5, wherein:
    said element is a revolving element having a radial direction; and
    said mass is displaceable in said radial direction of said revolving element.

9. The device according to claim 5, including an inhomogeneous, elastic rotating body coupled to said actuator, said body rotating about an axis and being coupled to said element and said mass.

10. The device according to claim 5, wherein said actuator is at least one electromagnet.

11. The device according to claim 5, wherein said actuator is at least one pneumatic element.

12. The device according to claim 5, wherein:
    said element is a revolving element; and
    said actuator revolves with said revolving element.

13. The device according to claim 5, wherein:
    the press has a frame; and
    said actuator is to be fixed to the frame.

14. The device according to claim 5, wherein said actuator is disposed at said mass.

15. The device according to claim 5, wherein said actuator is disposed on said mass.

16. In a printing press having at least one element, a device for suppressing vibrations, comprising
    a freely vibrating mass vibrating freely with one degree of freedom coupled to the element, said mass having at least one vibration parameter;
    a rotational speed measuring configuration for determining a rotational speed of the press;
    an actuator connected to said mass for changing said vibration parameter; and
    a control device connected to said rotational speed measuring configuration and to said actuator.

* * * * *